Patented Dec. 18, 1945

2,391,118

UNITED STATES PATENT OFFICE 2,391,118

PIGMENTS AND PAINTS AND METHOD OF MAKING SAME

Louis E. Barton, Windsor, Conn.

No Drawing. Application November 5, 1942,
Serial No. 464,659

7 Claims. (Cl. 106—256)

This invention relates to lead silicate pigments and paints and more particularly to a pigmentary lead silicate which is especially adapted for use as a tint base when ground with linseed oil or other suitable vehicle.

This application is a continuation-in-part of my United States application Serial No. 359,769, filed October 4, 1940, and includes a fuller disclosure of the method of making paint products with lead silicate pigments whereby exceptionally durable exterior paints can be prepared. Such fuller disclosures are based upon actual exposure tests resulting from longer and additional experience in the use of lead silicate pigments since filing the prior application referred to.

I have discovered that useful opaque lead silicate pigments can be made by heating a mixture of lead oxide, or a lead compound which upon heating yields lead oxide, and silica (silicon dioxide, $SiO_2$) under controlled temperature conditions whereby the reaction to form lead silicate takes place in the solid phase without fusion, thus ensuring a soft fine texture and other desirable physical qualities in the pigment product. Furthermore, I have discovered that paint products prepared with lead silicate pigments and a suitable vehicle, such as linseed oil with or without modifying addition, have exceptional durability under exterior exposure conditions and are substantially free from the usual defects of exterior paints for unusually long periods. Such improvement of exterior paint products, now verified by long exposure tests, are of far reaching importance, for the paints not only provide far more satisfactory and economic protection of both wood and metal surfaces, but even more importantly, particularly under the present conditions of war economy, would result in the saving of a large amount of lead since a unit weight and volume of lead silicate pigment can be prepared with a greatly reduced lead content as compared with other types of lead pigments.

By my process not only can I make lead silicate pigments of the regular molecular proportions such, for example, as subnormal lead silicate, $PbSi_2O_5$, normal lead silicate, $PbSiO_3$, and basic lead silicate, $Pb_2SiO_4$, but I can make also equally useful lead silicates with any basicity desired between the regular normal and basic formulae or of any subnormal composition desired between the regular subnormal and normal formulae. By the expressions normal lead silicate, subnormal lead silicate and basic lead silicate, as used in this specification and claims, I mean by normal lead silicate, a product having an equimolecular ratio of PbO to $SiO_2$, by subnormal lead silicate, a product having a ratio of PbO to $SiO_2$ less than equimolecular and by basic lead silicate a product having a ratio of PbO to $SiO_2$ greater than equimolecular. Lead silicate pigments other than the normal $PbSiO_3$, may contain, and some of them probably do contain, more than one definite chemical compound, the various silicates, basic, normal and subnormal, adjusting during the heating process proportionally in the product in accordance with natural laws to the state of most stable equilibrium. I can also make useful lead silicate pigments containing a higher percentage of silica than the regular formula, $PbSi_2O_5$, but, though such a pigment is cheaper, its hiding power is reduced and thus there is a practical limit based upon utility of the product in its application. Such a practical limit appears to be a subnormal lead silicate containing not less than 85% actual lead silicate calculated as regular subnormal lead silicate, $PbSi_2O_5$, and about 15% silica. The excess silica may be chemically or phsically combined or, possibly, partially in the free state.

Before giving detail examples showing the operation of my process and characteristics of the various products I shall give some general information relative to the raw materials, process and product.

The materials used should be as free from impurities as possible consistent with industrial availability, since small amounts of iron or other impurities tend to discolor the product. Either litharge (PbO), or other oxides of lead such as red lead ($Pb_3O_4$) or lead peroxide ($PbO_2$), may be used as a source of lead. Other lead compounds which yield the oxide upon heating may also be employed, such as white lead ($2PbCO_3.PbH_2O_2$). A pure grade of finely divided silica, either natural or artificially prepared, is suitable, in either hydrous or anhydrous form.

I first thoroughly mix the materials in the required proportions, either by dry-milling or, preferably, by wet-milling, thereby reducing particle size and also assuring a very close association of the ingredients. The milling may be done either in a batch or a continuous type of mill; in either case by the use of a porcelain or silex lining to avoid contamination of materials.

The slurry from the wet-mill is dewatered as by settling and decantation and/or filtration. Any suitable equipment may be used, such as Dorr tanks and filter presses.

The wet pulp is then charged directly into the heating furnace, or it may be preliminarily dried and then charged into the furnace. The furnace may be either of the batch type such as a muffle, hearth furnace or Bruckner furnace, or of the continuous kiln type. In either case a lining of high-grade fire brick is satisfactory to avoid contamination of materials. Whatever the type of furnace employed, means should be provided for control of temperature. In furnaces where products of combustion contact the charge, a neutral or oxidizing flame should be maintained to avoid possible reduction of metallic oxides.

The time required in the calcining zone depends upon the temperature. The higher the temperature within the permissible range, the shorter the time; however, there is a tendency to clearer color tones at the lower and medium temperatures within that range. Lead oxide and silica react at a temperature of 500° C. and at 550° C. I can make a substantially white lead silicate pigment by heating for a period of 48 hours. Lead silicates sinter and fuse if the upper limits of temperature range 650° C. for the subnormal, 680° C. for the normal and 725° C. for the basic lead silicate are exceeded for a considerable length of time.

While all my lead silicates can be made within a temperature range of 550 to 625° C., I prefer the following temperature ranges since at such temperatures the reaction is fairly rapid and yields a product having a soft texture and good hiding power; for lead silicates containing about 55 to 70% PbO, 575 to 610° C., for lead silicates containing about 70 to 85% PbO, 600 to 650° C.; for lead silicates containing above 85% PbO, 640 to 680° C.

Within the preferred temperature ranges specified the silicates require 1 to 2 hours in the calcining zone of the furnace. While the reaction is usually complete in 1 to 1½ hours, it is desirable to hold the charge at the proper temperature a little longer than appears absolutely necessary to insure that the reaction is complete. The progress of the reaction during calcination may be judged by withdrawing a sample from the furnace for inspection. The finished product should be substantially white and should not acquire a yellower color upon milling or grinding the sample in a mortar.

Lead silicate pigments, if not calcined at too high a temperature, are soft in texture and fine enough to be used as pigments for paint, but usually milling is required to break down aggregates, reduce particle size and develop full tinting strength and hiding power of the products.

Either dry or wet-milling methods may be used with or without air separation or wet classification respectively, thereby assuring uniformity of product. If wet-milling has been employed, the slurry is dewatered, dried, and if necessary passed through a disintegrator to break down lumps and aggregates.

The following examples show the working of my pigment process and properties of the resulting lead silicate pigments, but such examples should not be construed as limiting the application of my process since many other lead silicate pigments can be made within the general limits of proportions and temperatures.

*Example 1.—Subnormal lead silicate, $PbSi_2O_5$*

130 parts of lead oxide (litharge, PbO) and 70 parts silica were wet-milled together and the slurry dewatered and dried. The mixture was then calcined for 2 hours at 590 to 610° C. The product after milling had the following properties:

Specific gravity _____ 4.70
Chemical composition:
    Lead oxide _____per cent__ 64.80
    Silica _____do____ 35.20
Oil absorption 10.05 lbs. per 100 lbs. of pigment. Hiding power 70 compared with white lead standard taken as 100

*Example 2.—Normal lead silicate, $PbSiO_3$*

158 parts of lead oxide (litharge, PbO) and 42 parts of silica were wet-milled together and the slurry dewatered and dried. The mixture was then calcined for 2 hours at 610 to 625° C. The product after milling had the following properties:

Specific gravity _____ 5.86
Chemical composition:
    Lead oxide _____per cent__ 78.80
    Silica _____do____ 21.20
Oil absorption 7.37 lbs. per 100 lbs. of pigment. Hiding power 85 compared with white lead standard taken as 100

*Example 3.—Basic lead silicate, $Pb_2SiO_4$*

176 parts of lead oxide (litharge, PbO) and 24 parts of silica were wet-milled together and the slurry dewatered and dried. The mixture was then calcined for 2 hours at 665 to 675° C. The product after milling had the following properties:

Specific gravity _____ 7.03
Chemical composition:
    Lead oxide _____per cent__ 88.2
    Silica _____do____ 11.8
Oil absorption 6.55 lbs. per 100 lbs. of pigment. Hiding power 90 compared with white lead standard taken as 100

*Example 4.—Normal lead silicate, $PbSiO_3$*

162 parts of basic lead carbonate $$(2PbCO_3.PbH_2O_2)$$

and 38 parts of silica were wet-milled together and the slurry dewatered and dried; the mixture was then calcined for 1½ hours at 610 to 630° C. The product after milling had the following properties:

Specific gravity _____ 5.86
Chemical composition:
    Lead oxide _____per cent__ 78.80
    Silica _____do____ 21.20
Oil absorption 7.21 lbs. of oil per 100 lbs. of pigment. Tinting strength 93 as compared with white lead standard taken as 100

*Example 5.—Basic lead silicate*

A mixture of 85 parts of lead oxide, PbO, and 15 parts of silica was wet-milled for 1 hour and the slurry dewatered and dried. The mixture was then calcined for 3 hours at 680 to 600° C. and the calcined product finally dry-milled.

Composition of pigment:
    Lead oxide, PbO_____percent__ 85.00
    Silica _____do____ 15.00
Physical properties:
    Specific gravity_____ 7.01
    Oil absorption (parts of oil per 100 parts of pigment)_____ 7.00
    Tinting strength (compared with white lead standard=100)_____ 100

*Example 6.—Subnormal lead silicate*

A mixture of 63.7 parts of basic lead carbonate, $2PbCO_3.PbH_2O_2$ (white lead), equivalent to 55 parts of lead oxide, PbO, and 45 parts of silica was dry-milled for one hour.

The milled charge was calcined for 2 hours at a temperature of 575 to 585° C.

The calcined product was then wet-milled for 1 hour, dewatered and dried.

Analysis of pigment:
    Lead oxide, PbO _____ percent__ 55
    Silica _____ do____ 45
Physical properties:
    Specific gravity _____ 4.56
    Tinting strength (compared with white lead standard=100) _____ 70

Though the lead silicate pigments made as described are substantially white or very light colored when freshly prepared they are not invariably stable to the action of light and may acquire a gray or gray-brown tone or color in a few hours under the action of direct sunlight or after a longer period in diffused light. All of the lead silicate pigments whether subnormal, normal or basic are to some extent unstable to light but the instability increases with the basicity or content of lead oxide in the pigment. I have also found that the unstable characteristic of the pigment still persists to some extent after grinding with drying oil vehicles such as linseed oil, tung oil, and oil varnishes. The resulting paints upon exposure to light may acquire a grayish color which gradually becomes darker.

I have discovered that notwithstanding the darkening or graying effect which results upon exposure to light, my pigmentary lead silicate pigments made by the process indicated when compounded with a suitable vehicle, such as linseed oil or other suitable vehicle, yield paints having exceptional durability when exposed to sunlight and weather being highly resistant to both checking and chalking. While all my lead silicate pigments, subnormal, normal and basic, impart exceptional durability, I have observed from long paint-exposure tests that the basic lead silicate paints are appreciably more durable than those made with the subnormal and normal pigments. The general durability imparted to paints by lead silicate pigments adapts them to a particular field of application which will be further considered in this specification.

Two classes of white pigments are generally recognized: (1) The opaque white pigments, such as white lead, zinc oxide and titanium pigments which impart opacity and whitness when mixed with oil or other organic vehicles; and (2) The extender pigments, such as whiting and china clay which do not impart appreciable opacity when similarly mixed with vehicles.

The opaque pigments of class 1 are further subdivided into two classes: (a) Those which are reactive or capable of combining chemically or physico-chemically with ingredients of the vehicle, such as white lead and zinc oxide and (b) Those which are chemically inert, such as titanium pigments.

My new lead silicate pigments belong to the class of opaque reactive pigments, though they differ in degree of reactivity, i. e., the capacity to combine chemically or physico-chemically with the oleaginous constituents of film-forming vehicles in which they are incorporated, as indicated by the rate of drying when the pigments are mixed with a suitable vehicle and exposed as a paint film. The rates of drying or degrees of reactivity are in the order of the lead oxide contents of the pigments.

In the field of paints for exterior use much investigation has been conducted in an effort to combine the special features of the various white pigments and vehicles to overcome the defects in paint films resulting from exposure to light and weather. Such defects are chalking, checking and cracking, scaling, fading of color and dirt collection. The general durability of exterior paints is directly related to its resistance to chalking, checking, cracking and scaling but it is necessary to consider also the appearance or decorative value of the paint which is largely dependent upon such factors as gloss retention, tint retention or non-fading of color and cleanness of surface or resistance to dirt collection. Checking, cracking and scaling can be partially controlled by regulation of pigment volume concentration in the various coats of paint but the defect is of frequent occurrence with most combinations of commercial white pigments and linseed oil vehicle and is inevitable with some of the white pigments so compounded.

Deterioration of the paint film by chalking of white paints, if not excessive, may be advantageous since the washing away of the chalk formed carries with it much of the adherent dirt collected during earlier exposure, thus presenting a cleaner surface. The deterioration of tinted and colored paint films, made with present commercial white pigments, added color and linseed oil vehicle, presents a major problem. Not only does the chalking rapidly destroy the protective properties of the paint film but it also causes a serious fading of the color.

The outstanding characteristic of the lead silicate pigments is their capacity to impart durability to paints applied to either wood or metal surfaces. From the standpoint of both economy and durability lead silicates made by the process described are especially adapted as a base for tinted and colored paints. The pigment in tinted or colored paints is largely white, usually including some opaque white pigment, with lesser quantities of colored pigments. The colored or tinting pigment often supplies all the obscuring power or opacity required therefore the white base or tint base should not have greater opacity or hiding power than necessary since more of the colored pigment would then be required thus in most cases increasing the cost. As before shown by detail examples the opacity or hiding power of my lead silicate pigments, while ample to afford good hiding power in paints, is not exceptionally high and they are for that reason particularly suitable for use as a tint base.

As before stated, the degree of instability or darkening of lead silicate pigments appears to be proportional to their lead content and therefore the subnormal lead silicates, being less sensitive to light, should be used in making the lighter tints and the basic lead silicates used in darker colors. For example, the subnormal lead silicates are best adapted for making such tints as ivory or pale yellow; the approximately normal for many blue and brown tints and the basic for darker colors such as greens and grays. Such a lead silicate should be selected that the darkening effect under the action of light will be obscured by the tint or color desired.

In using my lead silicate pigments as a tint base I have discovered that compounding them with the coloring pigment and a vehicle consisting substantially of linseed oil gives particularly satisfactory results as regards general durability, resistance to chalking and fading and retention of gloss. The linseed oil vehicle of course includes the necessary small amounts of thinner, such as mineral spirits or turpentine, and drier. I have found it advantageous in some cases to use with the linseed oil lesser amounts of treated or bodied oils, either linseed or tung oil, which may in some cases contain modifying resins. I have found heavy-bodied linseed oil particularly useful in controlling the pigment volume concentration and flowing properties of the paint and improving the gloss of the dried paint film. The use of 5 to 10% of heavy-bodied linseed oil with the balance raw or refined linseed oil permits the application of a thick priming coat of high pigment volume concentration which can be followed by a finishing coat thus completing the painting in two coats. I have found it preferable to impart maximum durability to the paint by using only the lead silicate and the color as pigments for the paint but other pigments may be blended with the lead silicate with very satisfactory results if desired.

If it is desired to use lead silicate pigments for making white paints it is preferable to use the pigments which have been stabilized against discoloration by light as disclosed in my United States Patents Numbers 2,233,042 and 2,236,051 and in my copending United States patent application Serial Number 428,035 filed January 24, The following examples in Tables I and II show the application of my lead silicate pigments in the preparation of paints for exterior use. Table I shows the paint formulation and Table II shows the condition of the paint films after exposure.

The paints were prepared by grinding the pigments with enough of the oil to form a smooth paste and then reduced with the remainder of the oil, thinner and drier to proper consistency for painting.

The painted panels were all exposed in a vertical position facing south.

It is apparent from Examples 1, 2 and 3, in the tables, that after an exterior exposure for a period of 4 to 5 years the paint films are sound and apparently would afford ample protection for a period of several years longer. This result is exceptional in view of general experience with exterior paints which has been that many paints have entirely broken down after four years' exposure and in the majority of cases the structure needs repainting.

The substantial absence of fading and chalking in the gray paint of Example 1 indicates the special adaptability of lead silicate pigments in the preparation of tinted paints for exterior use.

The paints of Examples 4 and 5 have been formulated to adapt them for two-coat exterior painting. The clean surfaces and absence of fading and other defects after two years' exposure indicate the advantages of tinted lead silicate paints of this type for exterior use.

*Table I.—Paint formulation*

|  | Formula number | | | | |
|---|---|---|---|---|---|
|  | 1 | 2 | 3 | 4 | 5 |
| Pigment composition, weight percent | Normal lead silicate+0.5% lamp black. | Basic lead silicate, 100%. | Basic lead silicate, 100%. | Normal lead silicate+2.0% Indian red. | Normal lead silicate+0.5% lamp black. |
| Paint composition, percent by weight: | | | | | |
| Pigment | 70.03 | 73.70 | 73.70 | 72.80 | 72.80. |
| Raw linseed oil | 27.65 | 24.30 | 24.30 | 15.59 | 15.59. |
| Bodied linseed oil | | | | 2.87 | 2.87. |
| Turpentine | 1.59 | 1.40 | 1.40 | | |
| Mineral spirits | | | | 8.37 | 8.37. |
| Drier | 0.73 | 0.60 | 0.60 | 0.37 | 0.37. |
| Pigment volume concentration based on nonvolatile, percent. | 28.90 | 28.90 | 28.90 | 38.80 | 38.80. |
| Color | Gray | White | White | Red | Gray. |
| Panel material | Red-wood | Red-wood | Steel | Cedar | Cedar. |
| Number of coats on panel | 3 | 3 | 3 | 2 | 2. |

*Table II.—Results of exposure—Condition of paint*

|  | Formula number | | | | |
|---|---|---|---|---|---|
|  | 1 | 2 | 3 | 4 | 5 |
| Time exposed, months | 51 | 61 | 49 | 24 | 24. |
| Gloss | Considerable | None | Considerable | Fair | Fair. |
| Checking and cracking | None | do | (1) | None | None. |
| Chalking | Very slight | do | None | do | Do. |
| Fading | do | do | | do | Do. |
| Darkening by exposure to light. | | Appreciable | Appreciable | | |
| Dirt collection | Very little | Little | Very little | None | None. |
| General condition | Excellent | Good | Good | Excellent | Excellent. |

¹ Very slight alligatoring in surface coat only—no rusting.

1942, but lead silicate made by the process of the instant case can be used by blending it with highly opaque pigments such as titanium pigments in proportions to substantially obscure the darkening of the lead silicate when exposed to light. Such a combination results in a white paint of improved opacity and durability.

While I have particularly described the application of my novel lead silicate pigments in the preparation of paints with oleaginous vehicles, I do not limit myself to that type of vehicle for I have found these lead silicate pigments of general adaptability. In general the properties of my lead silicate pigments adapt them for application to oil, enamel and lacquer type paints and for other purposes where white pigments are used, such as for rubber, linoleum and other floor coverings, printing inks, vitrified enamel, etc.

I claim as my invention:

1. As a new composition of matter a protective coating composition comprising an oleaginous, film-forming and drying vehicle pigmented with an essentially pure anhydrous opaque white lead silicate pigment physico-chemically reactive with said vehicle, said pigment being formed by heating a mixture of lead compounds which upon heating will supply to the product only lead oxide in an amount between about 40% and about 88% (PbO) and silica at a temperature sufficiently high to chemically combine the oxides in the solid phase without fusion.

2. As a new composition of matter a protective coating composition comprising an oleaginous, film-forming and drying vehicle pigmented with an essentially pure anhydrous opaque white normal lead silicate pigment physico-chemically reacted with said vehicle, said pigment being formed by heating a mixture of substantially equimolecular proportions of lead oxide and silica at a temperature sufficiently high to chemically combine the oxides in the solid phase without fusion.

3. As a new composition of matter a protective coating composition comprising an oleaginous, film-forming and drying vehicle pigmented with an essentially pure anhydrous opaque white subnormal lead silicate pigment physico-chemically reactive with said vehicle, said pigment being formed by heating a mixture of lead oxide and silica containing between about 40% and about 78% lead oxide (PbO) at a temperature sufficiently high to chemically combine the oxides in the solid phase without fusion.

4. As a new composition of matter a protective coating composition comprising an oleaginous, film-forming and drying vehicle pigmented with an essentially pure anhydrous opaque white basic lead silicate pigment physico-chemically reactive with said vehicle, said pigment being formed by heating a mixture of lead oxide and silica containing between about 88% lead oxide (PbO) at a temperature sufficiently high to chemically combine the oxides in the solid phase without fusion.

5. As a new composition of matter a protective coating composition comprising an oleaginous, film-forming and drying vehicle pigmented with an essentially pure anhydrous opaque white subnormal lead silicate pigment containing 40 to 78% lead oxide and the balance silica physico-chemically reactive with said vehicle, said pigment being formed by heating a mixture of lead oxide and silica at a temperature sufficiently high to chemically combine the oxides in the solid phase without fusion.

6. As a new composition of matter a protective coating composition comprising an oleaginous, film-forming and drying vehicle pigmented with an essentially pure anhydrous opaque white basic lead silicate pigment containing 79 to 88% lead oxide and the balance silica physico-chemically reactive with said vehicle, said pigment being formed by heating a mixture of lead oxide and silica at a temperature sufficiently high to chemically combine the oxides in the solid phase without fusion.

7. As a new composition of matter a paint comprising an oleaginous, film-forming and drying vehicle pigmented with an essentially pure anhydrous opaque white lead silicate pigment physico-chemically reactive with said vehicle, said pigment being formed by heating a mixture of lead compounds which upon heating will supply to the product only lead oxide in an amount between about 40% and about 88% (PbO) and silica at a temperature sufficiently high to chemically combine the oxides in the solid phase without fusion.

LOUIS E. BARTON.